United States Patent Office.

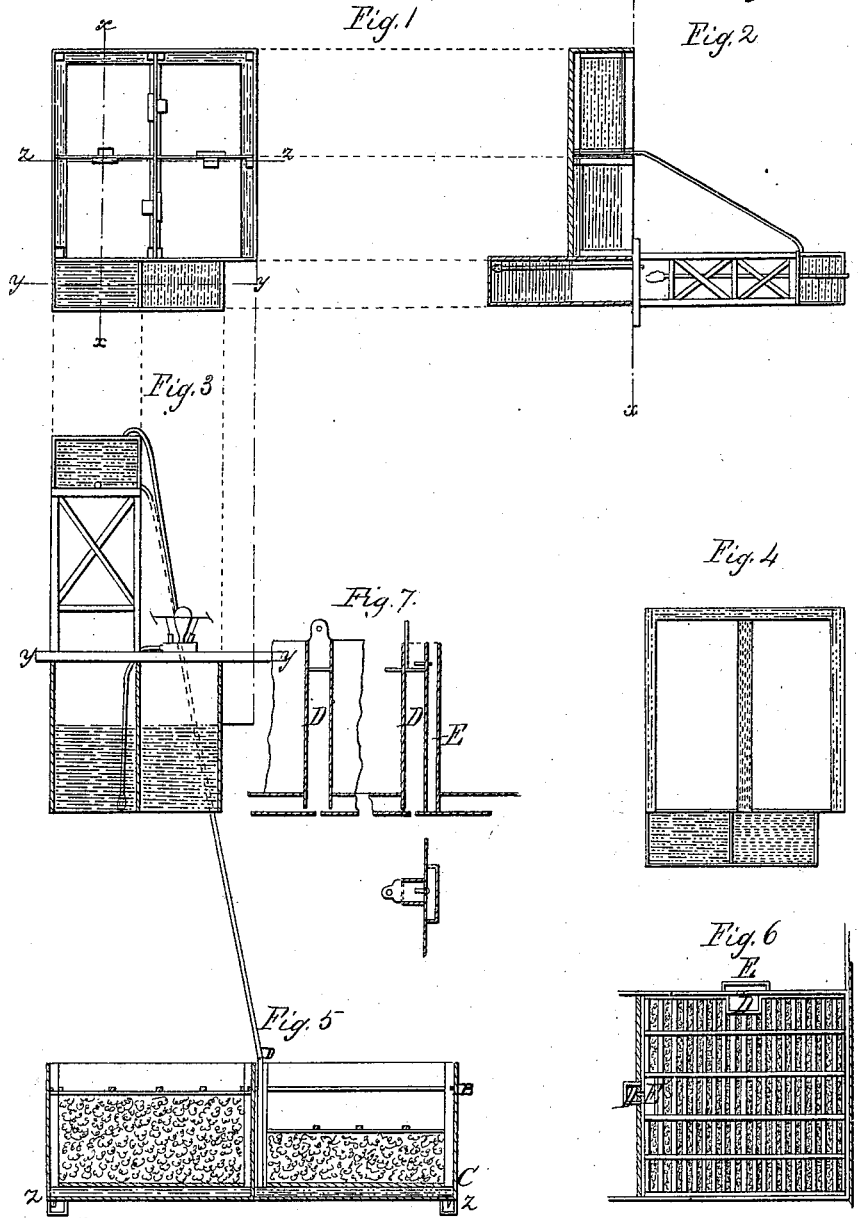

JAMES W. JONES, OF CUMBERLAND, MARYLAND.

Letters Patent No. 76,775, dated April 14, 1868.

IMPROVED APPARATUS FOR MAKING EXTRACTS FROM BARK AND OTHER MATERIALS.

*The Schedule referred to in these Letters Patent and making part of the same.*

TO ALL WHOM IT MAY CONCERN:

Be it known that I, JAMES W. JONES, of Cumberland, in the county of Alleghany, and State of Maryland, on November 5, 1867, obtained from the United States, for certain Improvements in Apparatus for Making Extracts from Bark and other Materials, Letters Patent, numbered 70,439. The substance of the invention embraced in and covered by said patent consists in applying to a single or any form of leach used for extracting tannin from bark, or to any other vessel containing material from which extracts are to be obtained, the principle of upward hydraulic pressure, and then, when the desired degree of strength has been extracted, downward hydraulic pressure, by drawing the liquor off at the bottom of the leach or other vessel, and thereby doubling the leaching capacity.

To this process, I have added certain new and useful improvements, of my own invention, which consist of an elevated tank, a pump or pumps, hose or pipes, strong and weak-liquor reservoirs, with their connections with the leaches, and of false tops to the leaches, and of which I declare the following to be a full, clear, and exact description, reference being had to the annexed drawings, and to the letters of reference marked thereon, and making part of this specification, in which—

Figure 1 is a plan view of a section of four leaches, such as I use, and of strong and weak-liquor reservoirs.

Figure 2, vertical sections of leaches and reservoirs on *x x*.

Figure 3, vertical section of reservoirs and elevated tank, with pump and hose or pipes on *y y*.

Figure 4, plan view of strong liquor and of weak-liquor pipes or connections between the reservoirs and leaches, separated from plan.

Figure 5, transverse vertical section of leaches on *z z*.

Figure 6, plan view of the false top.

Figure 7, sectional views of box-pipes, &c., described and embraced in my patent of November 5, 1867.

My present invention, as applied to the manufacture of leather, enables me to obtain stronger, more pure, and consequently more penetrating extracts of tannin than does even my first, patented November 5, 1867.

According to all modes of leaching, by applying the pressure of water or liquor to the ground bark upon the top alone, one necessarily forces the small capillaries and dust down between the larger pieces, greatly impeding the operation of extracting the tannin, for these small capillaries and dust, as they are driven down, pack and coat the larger pieces to such an extent as to render it impossible for the liquor to be brought freely in contact with the mass of bark, as is so desirable.

By my improved method, the upward pressure loosens up the mass, (no matter how finely ground—the finer the better, with my process,) and attacks it thoroughly, by means of the great natural power afforded by my elevated tank, which the following well-known formula proves it to possess, viz: "Every fluid column of three feet altitude, applied to a surface of two square feet, produces a pressure equal to three hundred and seventy-five pounds."

Now, my tank being placed, say, fifteen feet above the leaches, they being ten by ten feet, and six feet deep, gives a fluid column of twenty-one feet, applicable to one hundred square feet of surface, and consequently I obtain a pressure of over one hundred thousand pounds, which can be increased or diminished, simply by increasing or diminishing the elevation of the tank, the size of which is immaterial; mine is seven by nine, and six feet deep. Of course this is a vast amount of pressure, which could not be used without risk in an entirely water-tight vessel, but in an open leach it is perfectly manageable, as, by means of the valve or cock inserted near the bottom of the tank, the pressure can be cut off at any moment. To this valve or cock is attached a hose, of sufficient length to reach to the bottoms of the box-pipes D, and to discharge its contents under the false bottoms, and upon the floors of the leaches, over the centre of which the tank should be placed, as nearly as practicable, so as to secure, as far as possible, a perpendicular column. The tank can be supplied with water by an independent pump, (which is preferable,) or by the pump which is connected with the strong-liquor reservoir, when this is not otherwise employed, and which pump and reservoir furnish their supply of liquor for the "fresh-ground leach." The last "run," which is made from water, and is drawn off through the trough or pipe G, into the weak-liquor reservoirs, to be pumped ahead, as may be desired, by an independent pump, which should be stationed therein.

The upward pressure from the tank, besides its extracting power, drives the coloring-matter and other impurities toward the surface, they being much lighter than the tannin. Therefore, when the liquor is drawn off at the bottom, which is the downward pressure, as by my patent of November 5, 1867, it is more pure, and stronger, than can be made by any mode of leaching, according to which the liquor or water is applied to the ground bark upon the top alone, and the more purity and strength it possesses, the more penetrating it will be, as before asserted.

My experience is, thus far, that the liquors produced by my process, on account of the qualities which they possess, are less affected by frost than heretofore.

I am opposed to the use of warm water and steam in leaching bark, hemlock bark especially, for the reason that these agents operate promptly towards extracting coloring and resinous matter from all substances containing them; whilst cold water, which I use, will sufficiently extract tannin, when employed with the great pressure afforded by my system, and at the same time leave the coloring and resinous matter comparatively unextracted. The importance of this result, all tanners will appreciate.

Although opposed to, I do not prohibit, the use of warm water and steam upon the leaches, yet I would recommend "summer" heat, Fahrenheit, for the liquors before use on the stock.

Having given the operation, I will now allude to the construction and arrangement of my apparatus, part of which has already been described in the specification of my patent of November 5, 1867, and upon which I claim improvements, as at first stated.

A $A^1$ $A^2$ $A^3$ are four leach-tubs, of ordinary construction, about ten feet square.

B represents the false top of each leach, which is constructed of boards $b$, and of the cross-pieces, which serve as battens $b'$. The boards are placed upon the ground bark, with spaces between them of about half an inch. The outside boards should fit well around the box-pipes, dead-eyes, gripes, &c., inside the leaches, in order to prevent the formation of channels when the upward pressure is applied, which result would detract from the extent of the pressure, and allow the escape of bark as well as liquor. The drawing does not accurately show the spaces between the boards, but exhibits clearly the arrangement, and, by increasing or diminishing these, the upward hydraulic pressure can be regulated. However, the greater the spaces, the less the resistance.

C is the false bottom of each leach, and is arranged and constructed like the false top, and rests upon joists.

D D are box-pipes, open at the top, which convey the water or liquor to and under the false bottoms C C. The box-pipe D is provided with two sliding valves $d^2$ $d^3$, one arranged in the upper portion of its face, and the other directly across the upper portion of its throat. These valves work in grooves formed in the front and sides of the pipe. By means of a small opening, $d^1$, the pipe is connected with the dead-eye E of the adjoining leach, which communication can be cut off by inserting the plug $d$.

E E are dead-eyes, which are attached to the insides of the leaches, connecting, as before stated, with box-pipes D, up which and through the opening $d^1$, and down the box-pipe D, the water or liquor flows.

In each leach there are two small openings $f f$, one of which connects with the weak-liquor pipe G, and the other with the strong-liquor pipe H. The pipe G extends underneath the centre of the section of leaches, emptying into the reservoir G'. The pipe H extends underneath the outsides of the leaches, and empties into the reservoirs H'. The openings $f f$ are closed by long plugs or valve-rods $f' f'$, which are enclosed by the small box-pipes F F, and are made in or near the corners of the leaches.

G' and H' are the weak and strong-liquor reservoirs, which are connected with the leaches by the pipes G and H, first described. They may be constructed in any manner desired, but the greater portion of their capacities should be below the level of the bottoms of the leaches, adding thereby to the downward pressure, when the liquor is drawn off.

I is a tank, supported by suitable trestle-work I', constructed in any convenient manner, and erected at any desired height.

K is a hose, say, from one to three inches diameter, firmly secured to a cock or valve inserted near the bottom of the tank I, of length sufficient to extend to the false bottoms of all the leaches, down the box-pipes D, as shown in fig. 5 of drawing.

L is a pump, of any desired kind, connecting with the reservoir H' and the tank I, by suitable pipes or hose M M'.

N N are cleats, arranged around the insides of the leaches, about eighteen inches below the caps, up to which the ground bark raises the false top B, when the pressure from the tank I is applied, and which, resisting its further progress, serves, in connection with the false bottom and the great pressure upward, to hold the bark, as it were, in a press. Concerning the "running" of liquors, technically speaking, this is a matter of the operator's judgment.

I have thus shown and described the most convenient means of obtaining the desired power, and the arrangement of my tank, pump, &c., but it will readily occur to those skilled in the art, that, as my only object is to avail myself of the immense pressure gained by introducing a column of water or liquor at the bottom of the leach to aid the natural upward flow, and then to draw off the liquor at the bottom, various modifications, as well as different means might readily be adopted, without altering, in the slightest degree, the object of my invention. Therefore, I do not wish to be understood as limiting myself to this precise arrangement, but as covering all the well-known methods of forcing the water or liquor, provided the column is introduced at the bottom of the leach, in accordance with my plan, and in conjunction with the principles fully described and covered by my patent of November 5, 1867.

What I now claim as new, and of my invention, have described, and desire to secure by Letters Patent of the United States, is—

1. Introducing at the bottom of a vat, leach-tub, or other vessel, a column of water or liquor of any desired altitude, to increase the force of the upward hydraulic pressure, when the liquor is drawn off at the bottom, substantially as and for the purpose specified.

2. The combination and arrangement of the vats, leach-tubs, and other vessels, with the troughs or pipes G and H, and reservoirs G' and H', substantially as and for the purpose specified.

3. The combination and arrangement of the leaches, tank, and hose or pipes, when the same are constructed and arranged substantially as described.

4. The combination and arrangement of the leaches, reservoirs. pump, and hose or pipes, when the same are constructed and arranged substantially as described.

In testimony whereof, I have signed my name to this specification in the presence of two subscribing witnesses.

J. W. JONES.

Witnesses:
 JOHN D. BLOOR,
 EDWIN JAMES.